United States Patent
Gupta et al.

(10) Patent No.: US 9,681,365 B2
(45) Date of Patent: Jun. 13, 2017

(54) GROUP OWNER (GO) NEGOTIATION IN PEER TO PEER (P2P) COMMUNICATIONS TO OBTAIN GROUP OWNER ROLE

(71) Applicant: Aruba Networks, Inc., Sunnyvale, CA (US)

(72) Inventors: Manoj Gupta, Santa Clara, CA (US); Partha Narasimhan, Saratoga, CA (US)

(73) Assignee: Aruba Networks, Inc., Sunnyvale, CA (US)

(*) Notice: Subject to any disclaimer, the term of this patent is extended or adjusted under 35 U.S.C. 154(b) by 144 days.

(21) Appl. No.: 14/590,847

(22) Filed: Jan. 6, 2015

(65) Prior Publication Data

US 2016/0127950 A1 May 5, 2016

Related U.S. Application Data

(60) Provisional application No. 62/069,905, filed on Oct. 29, 2014.

(51) Int. Cl.
| | |
|---|---|
| *H04W 28/18* | (2009.01) |
| *H04W 48/16* | (2009.01) |
| *H04W 4/08* | (2009.01) |
| *H04W 8/00* | (2009.01) |
| *H04W 84/20* | (2009.01) |
| *H04W 8/18* | (2009.01) |

(52) U.S. Cl.
CPC ............ *H04W 48/16* (2013.01); *H04W 4/08* (2013.01); *H04W 8/005* (2013.01); *H04W 8/186* (2013.01); *H04W 84/20* (2013.01)

(58) Field of Classification Search
CPC ........ H04W 48/16; H04W 4/08; H04W 8/005; H04W 84/20; H04W 8/186; H04W 28/18
See application file for complete search history.

(56) References Cited

U.S. PATENT DOCUMENTS

| | | | |
|---|---|---|---|
| 2013/0223280 A1* | 8/2013 | Choi | H04L 67/104 370/254 |
| 2013/0329600 A1* | 12/2013 | Vedula | H04W 76/023 370/254 |
| 2015/0264123 A1* | 9/2015 | Smadi | H04L 51/046 709/206 |

OTHER PUBLICATIONS

IEEE Computer Society, "Part 11: Wireless LAN Medium Access Control (MAC) and Physical Layer (PHY) Specifications; IEEE Std 802.11-2012", Mar. 29, 2012, 63 pages, IEEE, USA.

(Continued)

*Primary Examiner* — Omar Ghowrwal
(74) *Attorney, Agent, or Firm* — Brooks, Cameron & Huebsch, PLLC

(57) ABSTRACT

According to one embodiment, a non-transitory computer readable medium within a first network device operating as an access point and comprising instructions which, when executed by one or more hardware processors, causes performance of a number of operations including transmission and reception of Peer-to-Peer messages between two or more network devices having Peer-to-Peer functionality. Thereafter, negotiations are conducted by network devices to selection of a Group Owner (GO) for a Peer-To-Peer group. The negotiations comprise specifically selecting a set of one or more values that ensures the first network device obtaining the GO role for Peer-to-Peer communications within the Peer-to-Peer group instead of randomly selecting the one or more values for the negotiating of the GO role.

20 Claims, 15 Drawing Sheets

(56) References Cited

OTHER PUBLICATIONS

Wi-Fi Alliance, "Wi-Fi Peer-to-Peer (P2P) Technical Spec. V. 1.5", Aug. 4, 2014, 13 pages, WiFi Alliance, USA.
Wi-Fi Alliance, "Wi-Fi Certified Wi-Fi Direct: Personal, portable Wi-Fi to connect devices anywhere, anytime", Sep. 2014, 8 pages, WiFi Alliance, USA.
IEEE Computer Society, "IEEE Standard for Air Interface for Broadband Wireless Access Systems; IEE Std 802.16-2012", Aug. 17, 2012, 3 pages, IEEE, USA.
Bluetooth, "Specification of the Bluetooth System", Dec. 2, 2014, 3 pages, Covered Core Package version 4.2, Bluetooth SIG Inc., USA.
IEEE Computer Society, "IEEE Standard for Local and Metropolitan Area Networks: Overview and Architecture; IEEE Std 802-2014", Jun. 12, 2014, 18 pages, IEEE, USA.
Wikipedia, https://en.wikipedia.org/wiki/Internet_Protocol, "Internet Protocol", Jan. 1, 2015, 6 pages, Wikipedia, USA.
USB Technology, http://www.usb.org/developers/docs/, "USB 3.1 Specification", Jul. 26, 2013, 37 pages, USB Implementers Forum Inc, USA.
Wikipedia, https://en.wikipedia.org/wiki/Asynchronous_Transfer_Mode, "Asynchronous Transfer Mode", Dec. 31, 2014, 11 pages, Wikipedia, USA.

* cited by examiner

| FIELD | SIZE (OCTETS) | VALUE (HEXADECIMAL) | DESCRIPTION |
|---|---|---|---|
| ... | ... | ... | ... |
| LENGTH 510 | 1 | | LENGTH OF THE FOLLOWING FIELDS IN THE P2P IE (IN OCTETS). THE LENGTH FIELD IS VARIABLE BASED ON THE TOTAL LENGTH OF P2P ATTRIBUTES |
| OUI 522 | 3 | | ORGANIZATIONALLY UNIQUE IDENTIFIER TO IDENTIFY MANUFACTURER |
| OUI TYPE 524 | 1 | 0x09 | IDENTIFYING TYPE OR VERSION OF THE P2P IE (E.G., SETTING TO 0x09 INDICATES WFA P2P v1.0) |
| P2P ATTRIBUTES 530 | VARIABLE | | ONE OR MORE P2P ATTRIBUTES THAT ARE PART OF THE P2P IE |

P2P INFORMATION ELEMENT (P2P IE) 415

| FIELD | SIZE (OCTETS) | VALUE (HEXADECIMAL) | DESCRIPTION |
|---|---|---|---|
| ATTRIBUTE ID 600 | 1 | VARIABLE | IDENTIFYING THE TYPE OF P2P ATTRIBUTE. THE SPECIFIC VALUE IS DEFINED IN FIG. 7 |
| LENGTH 610 | 2 | | LENGTH OF THE FOLLOWING FIELDS IN THE P2P ATTRIBUTE |
| ATTRIBUTE BODY FIELD 620 | VARIABLE | | ATTRIBUTE-SPECIFIC INFORMATION FIELDS |

P2P ATTRIBUTE 530

FIG. 6

P2P ATTRIBUTE ID MAPPING

| ATTRIBUTE ID | ATTRIBUTE CHARACTERISTIC |
|---|---|
| 0 | STATUS |
| 1 | MINOR REASON CODE |
| 2 | P2P CAPABILITY |
| 3 | P2P DEVICE ID |
| 4 | GROUP OWNER INTENT |
| 5 | CONFIGURATION TIMEOUT |
| 6 | LISTEN CHANNEL |
| 7 | P2P GROUP BSSID |
| 8 | EXTENDED LISTEN TIMING |
| 9 | INTENDED P2P INTERFACE ADDRESS |
| 10 | P2P MANAGEBILITY |
| 11 | CHANNEL LIST |
| 12 | NOTICE OF ABSENCE |
| 13 | P2P DEVICE INFO |
| 14 | P2P GROUP INFO |
| 15 | P2P GROUP ID |
| 16 | P2P INTERFACE |
| 17 | OPERATING CHANNEL |
| 18 | INVITION FLAGS |
| 19-220 | RESERVED |
| 221 | VENDOR SPECIFIC ATTRIBUTE |
| 225-255 | RESERVED |

*FIG. 7*

P2P IE 810
OF "GO NEGOTIATION REQUEST" MESSAGE 800

| | FIELD | SIZE (OCTETS) | VALUE (HEXADECIMAL) | DESCRIPTION |
|---|---|---|---|---|
| | ELEMENT ID | 1 | - | IEEE 802.11 VENDOR SPECIFIC USAGE |
| | LENGTH 910 | 1 | VARIABLE | PROVIDES INFORMATION TO DETERMINE TOTAL LENGTH (IN OCTETS) OF P2P IE 810 |
| 920 | OUI | 3 | - | ORGANIZATIONALLY UNIQUE IDENTIFIER TO IDENTIFY MANUFACTURER |
| | OUI TYPE | 1 | 0x09 | IDENTIFYING TYPE OR VERSION OF THE P2P IE (E.G., SET TO "0x09" INDICATES WFA P2P v1.0) |
| P2P ATTRIBUTES 930 | P2P CAPABILITY 940 | - | - | CAPABILITIES OF TX P2P NETWORK DEVICE (GROUP INVIT.; MULTI-GROUP;BITMAP; ETC.) |
| | P2P DEVICE INFO 945 | - | - | INFORMATION TO IDENTIFY TX P2P NETWORK DEVICE |
| | GROUP OWNER INTENT 950 | - | - | VALUES USED TO ESTABLISH GROUP OWNERSHIP (GROUP OWNER INTENT VALUE; TIE-BREAK. BIT) |
| | CONFIGURATION TIMEOUT 955 | - | - | IDENTIFIES WAIT PERIOD PRIOR TO TIMEOUT CAUSED BY NO RECEIPT OF GO RESP. MSG. |
| | LISTEN CHANNEL 960 | - | - | IDENTIFY OPERATING CLASS AND CHANNEL NUMBER FOR P2P DEVICE'S LISTEN STATE |
| | EXTENDED LISTEN TIMING 965 | - | - | IDENTIFIES WAIT PERIOD FOR LISTEN STATE |
| | INTENDED P2P INTERFACE ADDRESS 970 | - | - | DEVICE ADDRESS FOR TX P2P NETWORK DEVICE |
| | CHANNEL LIST 975 | - | - | LISTING OF ALL OPERATING FREQUENCY CHANNELS SUPPORTED BY TX P2P NET. DEVICE |
| | OPERATING CHANNEL ATTRIBUTES 980 | - | - | INFORMATION OF OPERATING CHANNEL IF GO (COUNTRY CODE, CHANNEL NUMBER, ETC.) |

*FIG. 9*

P2P IE 830
OF "GO NEGOTIATION RESPONSE" MESSAGE 820

| FIELD | SIZE (OCTETS) | VALUE (HEXADECIMAL) | DESCRIPTION |
|---|---|---|---|
| ELEMENT ID | 1 | - | IEEE 802.11 VENDOR SPECIFIC USAGE |
| LENGTH 1010 | 1 | VARIABLE | PROVIDES INFORMATION TO DETERMINE TOTAL LENGTH (IN OCTETS) OF P2P IE 820 |
| OUI | 3 | - | ORGANIZATIONALLY UNIQUE IDENTIFIER TO IDENTIFY MANUFACTURER |
| OUI TYPE | 1 | 0x09 | IDENTIFYING TYPE OR VERSION OF THE P2P IE (E.G., SETTING TO 0x09 INDICATES WFA P2P v1.0 |
| P2P CAPABILITY 1040 | - | - | CAPABILITIES OF RSP P2P NETWORK DEVICE (GROUP INVIT.; MULTI-GROUP; BITMAP; ETC.) |
| P2P DEVICE INFO 1045 | - | - | INFORMATION TO IDENTIFY TX P2P NETWORK DEVICE |
| GROUP OWNER INTENT 1050 | - | - | VALUES USED TO ESTABLISH GROUP OWNERSHIP (GROUP OWNER INTENT VALUE; TIE-BREAK. BIT) |
| CONFIGURATION TIMEOUT 1055 | - | - | IDENTIFIES WAIT PERIOD PRIOR TO TIMEOUT CAUSED BY NO RECEIPT OF GO CONFIRM MSG |
| INTENDED P2P INTERFACE ADDRESS 1070 | - | - | DEVICE ADDRESS FOR RESPONDING (RSP) P2P NETWORK DEVICE |
| CHANNEL LIST 1075 | - | - | LISTING OF ALL OPERATING FREQUENCY CHANNELS SUPPORTED BY RSP. P2P NET. DEVICE |
| OPERATING CHANNEL ATTRIBUTES 1080 | - | - | INFORMATION OF OPERATING CHANNEL IF GO (COUNTRY CODE, CHANNEL NUMBER, ETC.) |

FIG. 10

P2P IE 840
OF "GO NEGOTIATION CONFIRMATION" MESSAGE 830

| FIELD | SIZE (OCTETS) | VALUE (HEXADECIMAL) | DESCRIPTION |
|---|---|---|---|
| ELEMENT ID | 1 | - | IEEE 802.11 VENDOR SPECIFIC USAGE |
| LENGTH | 1 | VARIABLE | PROVIDES INFORMATION TO DETERMINE TOTAL LENGTH (IN OCTETS) OF P2P IE 840 |
| OUI | 3 | - | ORGANIZATIONALLY UNIQUE IDENTIFIER TO IDENTIFY MANUFACTURER |
| OUI TYPE | 1 | 0x09 | IDENTIFYING TYPE OR VERSION OF THE P2P IE (E.G., SETTING TO 0x09 INDICATES WFA P2P v1.0 |
| P2P ATTRIBUTES 1200: P2P CAPABILITY | - | - | CAPABILITIES OF P2P NETWORK DEVICE CONFIRMING P2P GROUP FORMATION – NORMALLY GROUP OWNER |
| P2P ATTRIBUTES 1200: STATUS 1210 | - | - | AN INDICATOR AS TO WHETHER THE GO NEGOTIATIONS WERE SUCCESSFUL OR NOT |
| P2P ATTRIBUTES 1200: CHANNEL LIST | - | - | LISTING OF ALL OPERATING FREQUENCY CHANNELS SUPPORTED BY TX P2P NET. DEVICE |
| P2P ATTRIBUTES 1200: OPERATING CHANNEL ATTRIBUTES | - | - | INFORMATION OF OPERATING CHANNEL IF GO (COUNTRY CODE, CHANNEL NUMBER, ETC.) |

*FIG. 12*

P2P IE 1315
OF BEACON MESSAGE 1300

| ATTRIBUTES | ATTRIBUTE ID | NOTE |
|---|---|---|
| P2P CAPABILITY *1320* | 2 | THE P2P CAPABILITY ATTRIBUTE SHALL BE PRESENT IN THE P2P IE |
| P2P DEVICE ID *1325* | 3 | THE P2P DEVICE ID ATTRIBUTE SHALL BE PRESENT IN THE P2P IE |
| NOTICE OF ABSENCE *1330* | 12 | THE NOTICE OF ABSENCE ATTRIBUTE SHALL BE PRESENT IN THE P2P IE IN THE BEACON FRAMES TRANSMITTED BY A P2P GROUP OWNER WHEN A NOTICE OF ABSENCE SCHEDULE IS BEING ADVERTISED |

*FIG. 14*

P2P GROUP INFO ATTRIBUTE
1388

| FIELD NAME | SIZE (OCTETS) | VALUE (HEXADECIMAL) | DESCRIPTION |
|---|---|---|---|
| ATTRIBUTE ID | 1 | 14 | IDENTIFYING THE TYPE OF P2P ATTRIBUTE (P2P GROUP INFO) |
| LENGTH | 2 | VARIABLE | LENGTH OF THE FOLLOWING FIELDS IN THE ATTRIBUTE |
| P2P RESOURCE/CLIENT INFORMATION DESCRIPTOR(S) 1500 | SUM OF ALL P2P RESOURCE/ CLIENT INFO DESCRIPTOR(S) | - | LIST OF P2P CLIENT INFO DESCRIPTOR(S) FOR P2P NETWORK DEVICES ASSOCIATED WITH THIS P2P GROUP OWNER |

*FIG. 15*

P2P CLIENT INFORMATION DESCRIPTOR
1500

| FIELD NAME | SIZE (OCTETS) | VALUE (HEXADECIMAL) | DESCRIPTION |
|---|---|---|---|
| LENGTH 1610 | 1 | VARIABLE | LENGTH OF THE FOLLOWING FIELDS IN THE ATTRIBUTE |
| P2P DEVICE ADDRESS 1615 | 6 | | AN IDENTIFIER USED TO UNIQUELY REFERENCE A P2P DEVICE |
| P2P INTERFACE ADDRESS 1620 | 6 | | AN ADDRESS USED TO IDENTIFY A P2P NETWORK DEVICE WITHIN A P2P GROUP |
| DEVICE COMPABILITY BITMAP 1625 | 1 | VARIABLE | A SET OF PARAMETERS INDICATING P2P DEVICE'S CAPABILITIES |
| CONFIG METHODS 1630 | 2 | | THE COMMUNICATION PROTOCOLS SUPPORTED BY THE FIRST P2P (EDGE) DEVICE (e.g., PIN FROM A KEYPAD, ETC.) |
| ... | ... | ... | ... |

GROUP OWNER (GO) NEGOTIATION IN PEER TO PEER (P2P) COMMUNICATIONS TO OBTAIN GROUP OWNER ROLE

CROSS-REFERENCE TO RELATED APPLICATIONS

This application claims the benefit of priority of U.S. Provisional Application No. 62/069,905 filed Oct. 29, 2014, the entire contents of which are incorporated by reference.

1. FIELD

Embodiments of the disclosure relate to the field of wireless networks. More specifically, one embodiment of the disclosure relates to a managed peer-to-peer (P2P) wireless network with P2P network (edge) devices, such as access points for example, operating as P2P group owners and advertising P2P network services.

2. GENERAL BACKGROUND

Wireless local area networks (WLANs) have become ubiquitous in many countries around the world. Many of these WLANs are configured to support a centralized wireless communication protocol such as the IEEE 802.11-2012 standard entitled "Telecommunications and information exchange between systems Local and metropolitan area networks-Specific requirements Part 11: Wireless LAN Medium Access Control (MAC) and Physical Layer (PHY) Specifications." While the centralized wireless communication protocol provides a well-defined management scheme for controlling access to network services (e.g., printers, projectors, etc.), these protocols also require that all communications directed to network services are routed through the APs.

Hence, in the event of a substantial increase in data traffic or a substantial increase in the use of network services, a greater number of APs are normally needed to handle the increased traffic. This may require significant outlay of capital, especially for the installation of the additional APs and the reconfiguration of the network. Otherwise, the network may experience prolonged latency in its use of network services.

Recently, there has been interest in configuring WLANs to support a peer-to-peer (P2P) communication protocol, such as communications in accordance with the P2P communication standard entitled "Wi-Fi Peer-to-Peer (P2P) Technical Specification." The P2P communication protocol allows network devices to communicate directly with each other without the need of central AP that operates as a gateway for the wired network. While P2P communications eliminate AP-controlled traffic for network services, this decentralized network architecture makes it difficult to manage network services for an enterprise network.

A mechanism to manage P2P communications, especially in enterprise networks, is urgently needed.

BRIEF DESCRIPTION OF THE DRAWINGS

Embodiments of the invention are illustrated by way of example and not by way of limitation in the figures of the accompanying drawings, in which like references indicate similar elements and in which:

FIG. 5 is an exemplary data structure of the P2P Information Element within the Probe Request message.

FIG. 6 is an exemplary embodiment of a data structure for the P2P attribute field within the P2P Information Element of FIG. 5.

FIG. 7 is an exemplary embodiment of an illustrative listing of the attribute identifiers associated to identify functionality of a P2P attribute field within the P2P Information Element of FIG. 5.

FIG. 9 is an exemplary embodiment of a data structure of the P2P Information Element of the GO Negotiation Request message associated with the P2P Group Owner Negotiation phase of FIG. 8.

FIG. 10 is an exemplary embodiment of a data structure of the P2P Information Element of the GO Negotiation Response message associated with the P2P Group Owner Negotiation phase of FIG. 8.

FIG. 12 is an exemplary embodiment of a data structure of the P2P Information Element of the GO Negotiation Confirmation message associated with the P2P Group Owner Negotiation phase of FIG. 8.

FIG. 14 is an exemplary embodiment of a data structure of the P2P Information Element of the Beacon message associated with the P2P Group Management phase of FIG. 13.

FIG. 15 is an exemplary embodiment of a data structure of the P2P Group Information Attribute of the Probe Response message associated with the P2P Group Management phase of FIG. 13.

FIG. 16 is an exemplary embodiment of a data structure of the P2P Resource/Client Information Descriptor(s) being a field within P2P Group Information Attribute of the Probe Response message associated with the P2P Group Management phase of FIG. 13.

DETAILED DESCRIPTION

I. Overview

Figure 1:
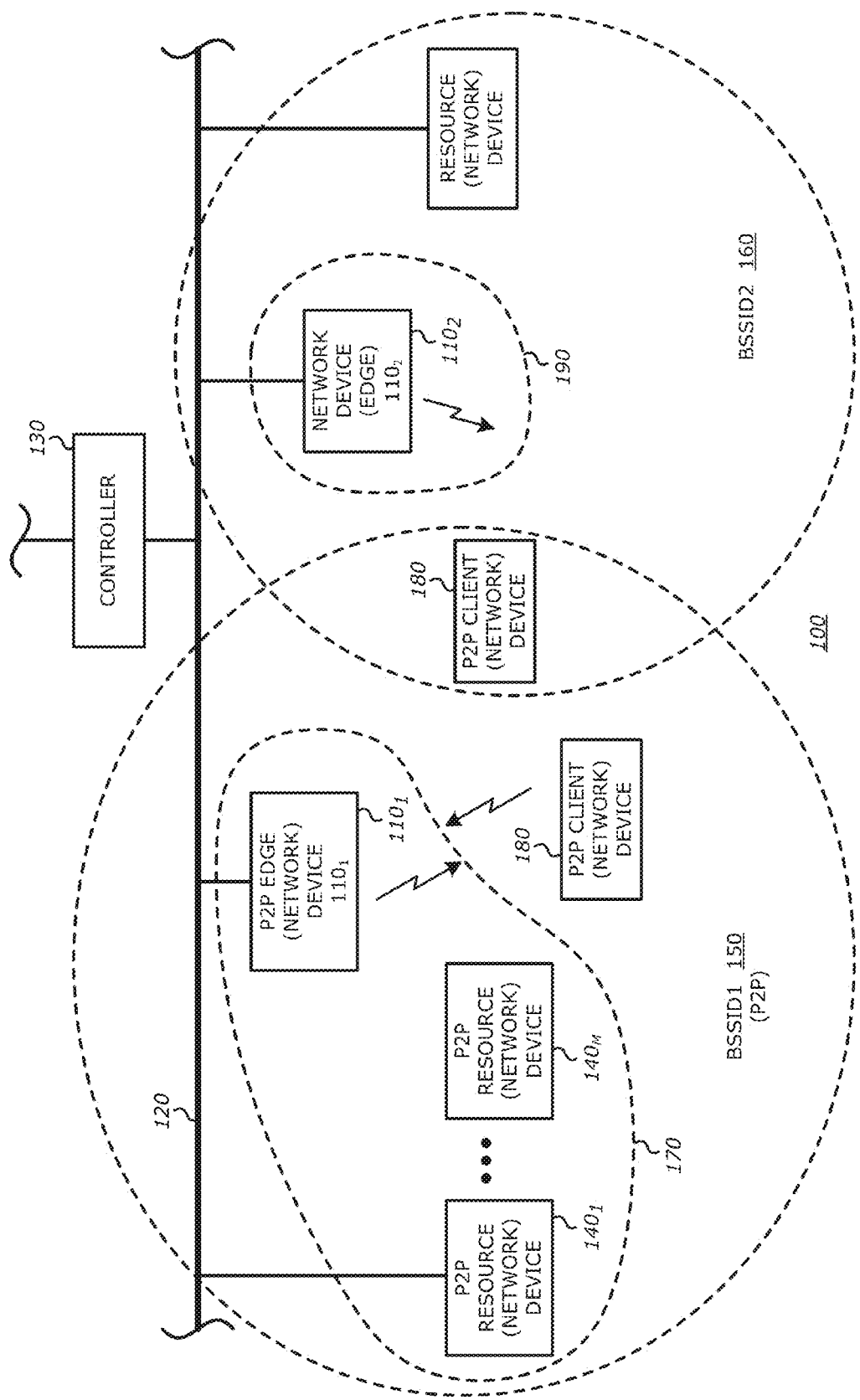
FIG. 1 is an exemplary embodiment of a wireless network supporting a peer-to-peer (P2P) communication protocol.

Embodiments of the disclosure relate to a system and method for managing peer-to-peer (P2P) communications in which a network device with P2P functionality, such as an access point (AP) for example, is configured to assist in the formation of a P2P group and to exclusively operate as a Group Owner (GO) and undertake a GO role. Subsequently, the group-owner AP (hereinafter "GO_AP") may advertise and communicate P2P capabilities through broadcast messages (e.g., beacons) and manage P2P group information received in one or more messages (e.g., PROBE REQUEST messages) from network devices with P2P functionality (generally referred to as "P2P network devices"). This scheme ensures that communications are effectively managed, at an AP and/or controller level, even in an ad hoc network deployment.

According to this communication protocol, P2P network devices need to associate and establish communications with the GO_AP. This association with the GO_AP provides the GO_AP with an opportunity to manage access to a particular P2P group that is offering certain network services, although data transmissions are conducted between P2P network devices belonging to the same P2P group without routing such data through the GO_AP. This association further provides an opportunity to distribute parameters (e.g., rates, information for establishing device priority, etc.) among the P2P network devices.

In addition to or in lieu of handling PROBE REQUEST messages from P2P network devices, it is contemplated that the GO_AP may detect that the P2P network device within its communication boundary (sometimes referred to as its "RF neighborhood") also supports a secondary P2P communication protocol sometimes referred to as "P2P Group Invitation". As a result, in lieu of a PROBE REQUEST/RESPONSE message exchange, the GO_AP may also be configured to transmit a unicast or multicast P2P Invitation message, which includes (i) the Basic Service Set Identification (BSSID) reserved for the P2P group and the operating channel of the P2P group. The P2P Invitation message provides necessary information for the P2P network device to directly communicate with other network devices belonging to that P2P group.

More specifically, in order to formulate a P2P group, a first P2P network device conducts a multi-phase operation. The first P2P network device, such as a wireless access point (AP) for this illustrative embodiment, commences a P2P Device Discovery phase. During the P2P Device Discovery phase, the first P2P network device (AP) uncovers all other P2P network devices that are operating on radio frequency (RF) channels associated with one or more prescribed frequency bands supported by the first P2P network device. For instance, as an illustrative embodiment, the first P2P network device (AP) may transmit one or more messages (e.g., PROBE REQUEST messages) to check for P2P network devices operating within a plurality of channels associated with the 2.4 gigahertz (GHz) band (e.g., 11 RF channels in the North American domain or 13 RF channels for the European domain) and/or 5 GHz band (e.g., over 20 channels in the North American or Japan domain, approximately 19 channels in European domain, etc.). Normally, timely receipt of a message (e.g. PROBE RESPONSE message) in response to the transmitted message (e.g., PROBE REQUEST message) identifies that a second P2P network device is operating on the particular RF channel.

Concurrently or subsequent to the P2P Device Discovery phase, the first P2P network device or the second P2P network device commences a P2P Group Owner Negotiation phase in order to establish a P2P group. Where the first P2P network device is an AP, the first P2P network device may conduct these negotiations so that either (1) the AP is selected as the group owner (referred to as "GO_AP") or (2) the P2P group is not yet established.

After the P2P group is established, however, the GO_AP may transmit one or more management frames (e.g., beacons) over different RF channels to advertise the P2P group. The GO_AP controls and maintains which P2P network devices may join the P2P group. When joining the P2P group, the second P2P network device may operate as (i) a resource to provide network services or (ii) a client that utilizes the network services upon joining this particular P2P group. Subsequently, the second P2P network device is able to communicate directly to any of the P2P network devices within its P2P group.

II. Terminology

Herein, certain terminology is used to describe features within embodiments of the invention. For example, the term "P2P network device" generally refers to an electronic device that is adapted with circuitry to communicate over a wired and/or wireless network and support P2P communications. Such circuitry may include one or more of the following: (i) processing circuitry (e.g., processor, processor core, microcontroller, application specific integrated circuit "ASIC", programmable gate array, etc.); (ii) one or more communication interfaces such as a wireless interface that includes one or more radio units (e.g., component(s) that handle the wireless data transmission and/or reception in one or more frequency bands) and/or a physical connector to support wired connectivity; (iii) memory in the form of a non-transitory computer readable storage medium (e.g., a programmable circuit; a semiconductor memory such as a volatile memory such as random access memory "RAM," or non-volatile memory such as read-only memory, power-backed RAM, flash memory, phase-change memory or the like; a hard disk drive; an optical disc drive; etc.); and/or (iv) any connector for receiving a portable memory device such as a Universal Serial Bus "USB" flash drive, portable hard disk drive, or the like.

Different types of P2P network devices may include, but are not limited to (1) a P2P edge device; (2) a P2P resource device; (3) a P2P client device; and/or (4) a data control device that control propagation of data over a network (e.g., a network switch, a controller, a router or a brouter). For instance, a "P2P edge device" may include a network device that manages the formation of and/or subsequent membership to a P2P group. Examples of a P2P edge device include a wireless access point (AP), a wireless base station, a Bluetooth® receiver/transceiver, or any device configured as a hot spot or gateway that is capable of forming and/or controlling access to a particular P2P group.

A "P2P resource device" may include a network device that supports P2P functionality and provides network services (or resources) that may be used by another P2P network device. For instance, one type of P2P resource device is a network-connected printer. Other types of P2P resource devices may include an overhead projector or a network device that controls streaming of video for display.

The "P2P client device" may be a stationary network device (e.g., desktop computer, television, set-top box, video gaming console, etc.) or a mobile network device that has capable of connecting to one or more networks and supporting any P2P communication protocol. Illustrative examples of mobile network devices may include a tablet, laptop, netbook, bar-code scanner, a digital camera, and/or a mobile handset such as a smartphone, personal digital assistant "PDA", or the like.

Herein, the term "logic" is generally defined as hardware and/or software. For example, as hardware, logic may include processing circuitry (e.g., a microcontroller, any type of processor, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, a source code, an object code, a shared library/dynamic load library, or one or more instructions. These software modules may be stored in any type of a suitable non-transitory computer readable medium (described above) or transitory computer readable transmission media (e.g., electrical, optical, acoustical or other form of propagated signals such as carrier waves, infrared signals, digital signals).

In a wireless distributed system, a P2P edge device operating as a group owner of a P2P group along with other P2P network devices that are members of that P2P group are referred to as a "Basic Service Set" or "BSS". An example of a particular type of wireless distributed system includes a first type of wireless (WiFi™) network operating in accordance with the IEEE 802.11-2012 standard. It is contemplated that the invention may be applicable to many other network types such as a second type of wireless (WiMax™) network (representative of an IEEE 802.16-based network), and/or a Bluetooth™ network. The BSS is uniquely identified by a BSS Identification (BSSID), which also correlates to a Service Set Identifier (SSID) being the informal name of the BSS. For a BSS operating in infrastructure mode, the BSSID is the Media Access Control (MAC) address of a Virtual Access Point (VAP).

The term "link" is a physical or logical communication path between two or more network devices. Examples of links supporting wireless communications may include certain radio frequency (RF) channels and/or bands, as well as the logic associated therewith.

The terms "connected" and "connection" generally relate to an established communication path between two network devices that enables one network device to transfer data targeted specifically for receipt by the other network device.

The term "message" generally refers to information transmitted as information in a prescribed format, where each message may be in the form of one or more packets, one or more frames, an Asynchronous Transfer Mode (ATM) cell, or any other series of bits having the prescribed format.

Lastly, the terms "or" and "and/or" as used herein are to be interpreted as an inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

III. General Architecture

Referring to FIG. 1, an exemplary embodiment of a wireless network 100 supporting a peer-to-peer (P2P) communication protocol is shown. Herein, the wireless network 100 comprises "N" edge devices $110_1$-$110_N$ (N≥1), where each of the edge devices $110_1$-$110_N$ operates as a gateway and provides communicative coupling to a wired network 120. One or more of the edge devices (e.g., edge device $110_1$) is further adapted to support P2P communications and is in communications with a controller 130, which may assist in managing and/or monitoring of P2P groups across the entire wireless network 100. As an illustrative example, the P2P edge device $110_1$ may be deployed as an access point (AP) that controls connectivity over the wireless (e.g., WiFi™) network 100. Of course, as an alternative, the P2P edge device $110_1$ may be deployed as a wireless base station that controls connectivity to the wireless network 100, where the wireless network 100 operates as a WiMAX™ network.

Figure 2:
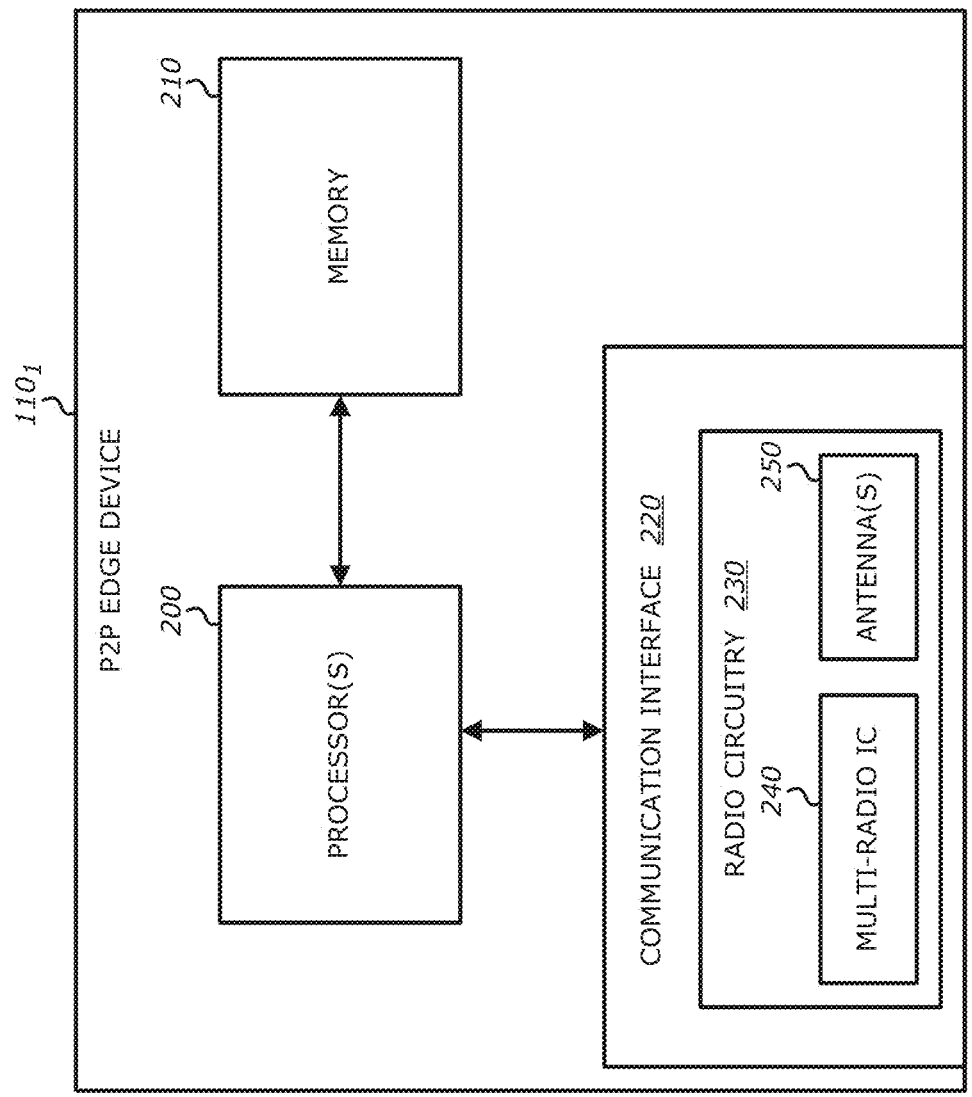
FIG. 2 is an exemplary embodiment of a P2P edge device of FIG. 1.

As shown in FIG. 2, an exemplary embodiment of the P2P edge device $110_1$ is shown. Herein, the P2P edge device $110_1$ comprises one or more processors 200, a memory 210 and a communication interface 220, which includes radio circuitry 230. The radio circuitry 230 supports a plurality of frequency bands, such as 2.4 gigahertz (GHz) and 5 GHz frequency bands for example. According to one embodiment of the disclosure, the radio circuitry 230 comprises a dual-band, multi-radio integrated circuit 240 that is coupled to one or more antennas 250. Alternatively, although not shown, it is contemplated that the radio circuitry 230 may comprise a first radio unit operating in accordance with a first frequency band (e.g., 2.4 GHz) and a second radio unit operating in accordance with a second frequency band (e.g., 5 GHz). The first radio unit and the second radio unit are deployed as separate electronic components. The memory 210 comprises one or more software modules that, when executed by processor(s) 200, controls P2P group formation, including operations associated with the P2P Device Discovery phase, the P2P Group Owner Negotiation phase and the P2P Group Management phase, as described below.

Referring back to FIG. 1, the P2P edge device $110_1$ is configured with transmission and/or reception ranges that formulate a first RF neighborhood 150, which is based on a first BSSID (BSSID1) associated with a Media Access Control (MAC) address of the P2P edge device $110_1$. The BSSID1 is reserved by the P2P edge device $110_1$, operating as a group owner, for P2P communications. Similarly, another edge device $110_2$ is configured with transmission and/or reception ranges that formulate a second RF neighborhood 160, which is based on a second BSSID (BSSID2) associated with the MAC address of the second edge device $110_2$. As shown, BSSID2 does not support P2P communications.

As one or more P2P resource devices $140_1$-$140_M$ (M≥1), which are configured to provide network services, are discovered within the first RF neighborhood 150, the P2P edge device $110_1$ communicates with these P2P resource device(s) $140_1$-$140_M$, such as P2P resource devices $140_1$ and $140_2$ for example. Such communications are conducted to formulate and/or expand network services offered by a first P2P group 170.

Upon joining the first P2P group 170, P2P client devices 180 may directly communicate with the P2P resource devices $140_1$ and $140_2$ that are members of the first P2P group 170. This allows the P2P client devices 180 to use the network services (e.g., printer, projector, etc.) offered by the P2P resource devices $140_1$ and $140_2$ via direct communications therewith.

Although not shown, the second edge device $110_2$ may operate as a second P2P edge device. For this exemplary implementation, the second P2P edge device $110_2$ would be a group owner of an expanding second P2P group 190, which is different from the first P2P group 170 and includes P2P resource devices within the second RF neighborhood 160. While P2P resource devices $140_1$ and $140_2$ are outside the RF neighborhood 160 for second P2P edge device $110_2$, it is contemplated that P2P resource devices within both RF neighborhood 150 and 160 could become a member of multiple P2P groups 170 and 190.

IV. P2P Device Discovery Phase

Figure 3:
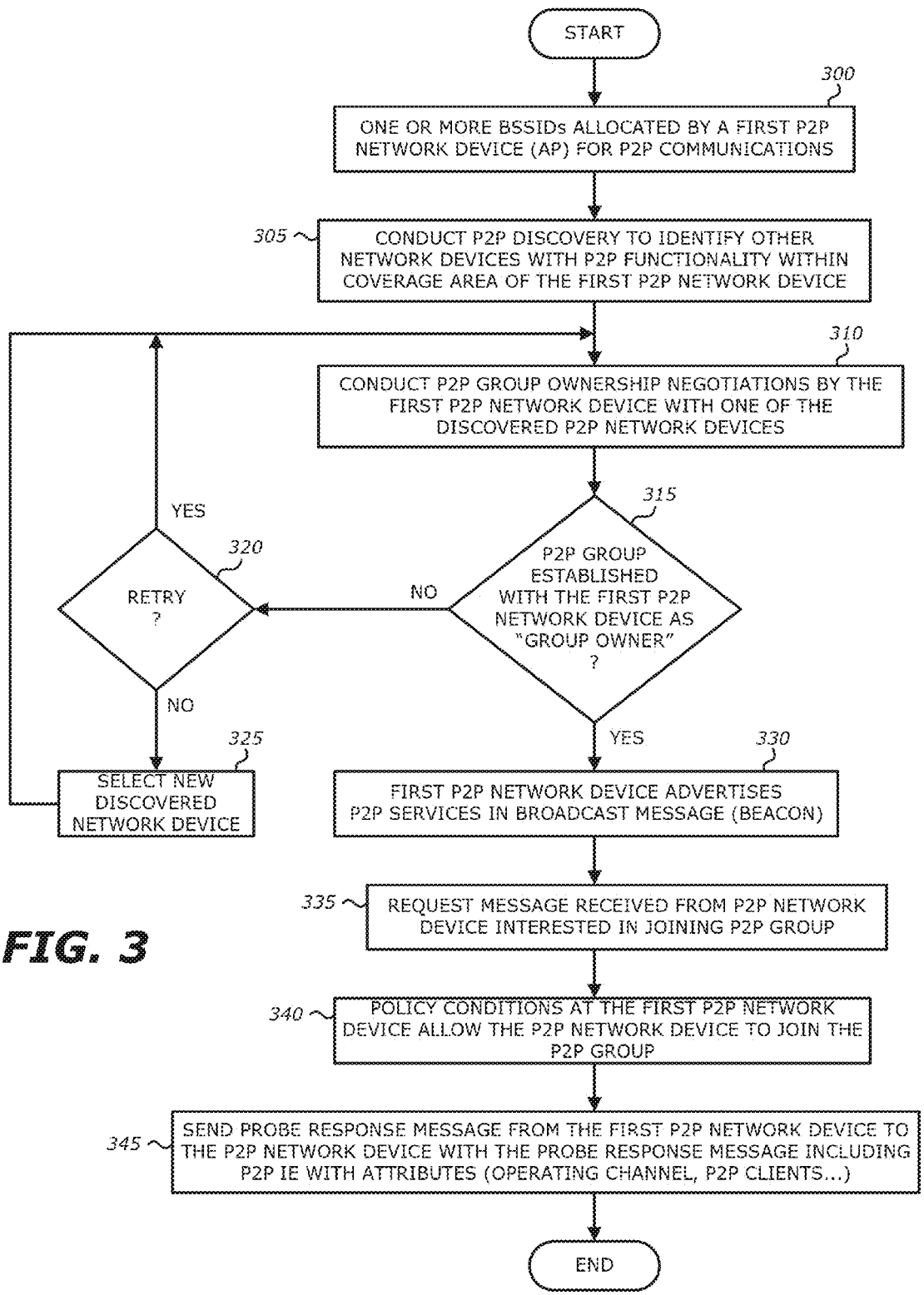
FIG. 3 is an exemplary embodiment of a P2P group formation scheme conducted by a first P2P network device.

Referring to FIGS. 3-7, an exemplary embodiment of a P2P group formation scheme conducted by a first P2P network device (e.g., P2P edge device $110_1$ of FIG. 1) is shown. Herein, as shown in FIG. 3, one or more BSSIDs are allocated by the P2P edge device for P2P communications (block 300). Thereafter, the P2P edge device conducts the multi-phase, P2P group formation scheme, which includes the P2P Device Discovery phase (block 305), the P2P Group Owner Negotiation phase (blocks 310-325), and/or the P2P Group Management phase (blocks 330-345).

Figure 4:
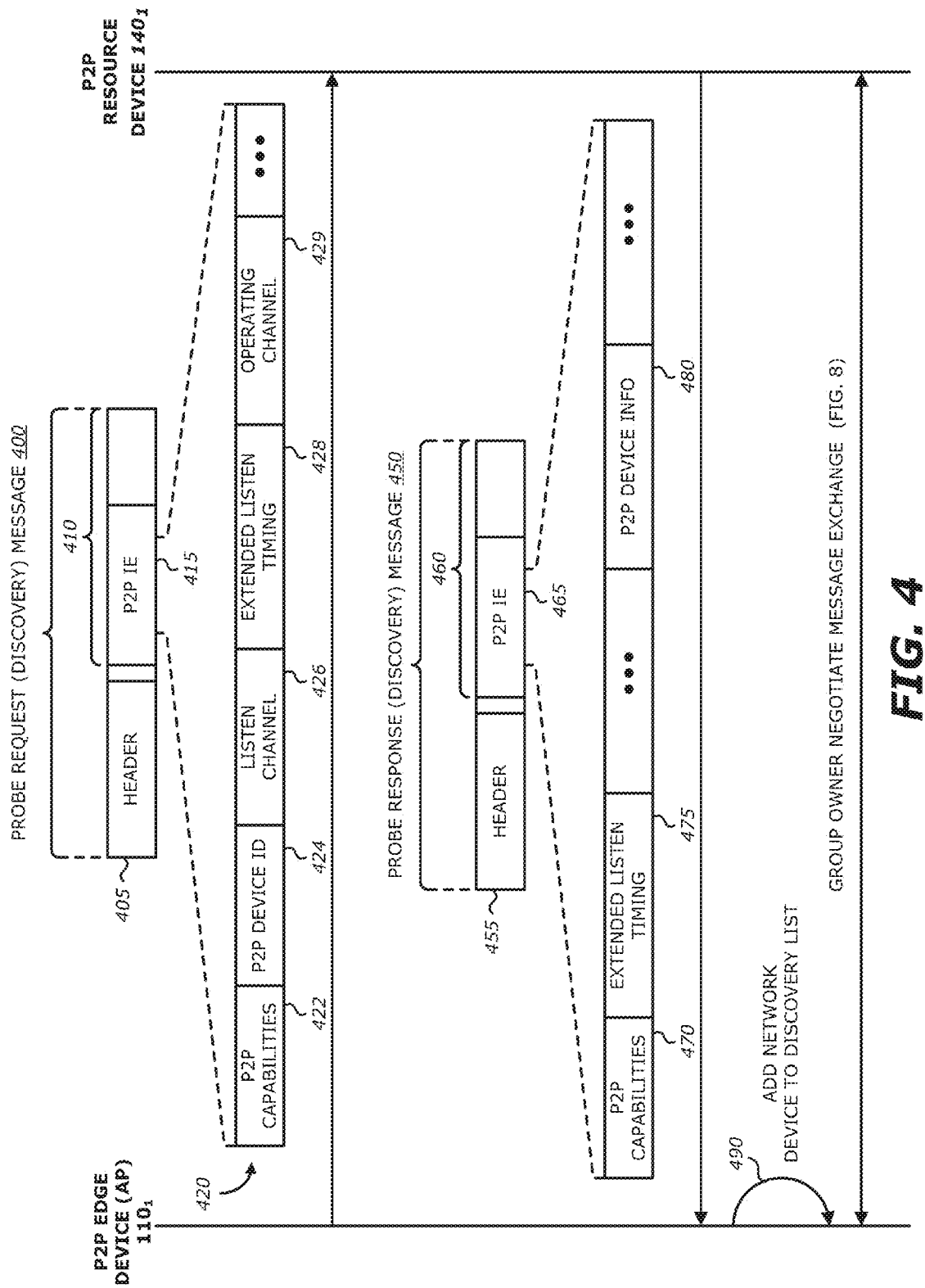
FIG. 4 is an exemplary embodiment communication flow of the P2P Device Discovery phase.

According to one embodiment of the disclosure, the P2P edge device includes radio circuitry that supports communications over one or more wireless frequency bands (e.g., 2.4 GHz and/or 5 GHz). As shown in FIG. 4, during the P2P Device Discovery phase, a first P2P network device transmits a message over each frequency channel associated with its supported wireless frequency band(s) (e.g., 2.4 GHz and/or 5 GHz) and listens for one or more responses to each transmitted message. The response message identifies that another P2P network device has received the transmitted message. Information associated with the responding P2P network devices is stored as part of a discovery list for further use in P2P group formation as described below.

More specifically, as an illustrative embodiment, during the P2P Device Discovery phase, the first P2P network device (e.g., P2P edge device $110_1$) transmits a first message 400 (e.g., PROBE REQUEST message) that includes a header portion 405 and a body portion 410. The body portion 410 comprises a P2P information element (P2P IE) 415, which includes a plurality of P2P attributes. For this embodiment, the P2P attributes include P2P capabilities 422, P2P Device Identifier (ID) 424, Listen Channel 426 and Extended Listen Timing 428. Exemplary data structures of a P2P information element (e.g., P2P IE 415) and of one or more P2P attributes that are contained within the P2P IE 415 are shown in FIGS. 5-7.

Referring to FIG. 5, an exemplary data structure of the P2P IE 415 is shown. Herein, the P2P IE 415 comprises a plurality of fields, including a length field 510, one or more P2P network device information fields 520 and one or more P2P attribute fields 530.

The length field 510 identifies the total length of the P2P IE 415. The length field 510 accounts for the collective size of the P2P attribute fields 530, and thus, may be used to ensure receipt of all data associated with the P2P IE 415.

The P2P network device information field(s) 520 includes an Organizationally Unique Identifier (OUI) field 522 and OUI Type field 524. The OUI field 522 identifies the manufacturer of the first P2P network device that is transmitting the first message 400 of FIG. 4, which includes the P2P IE 415. The OUI Type field 524 identifies the type/version of the P2P IE 415.

As shown in FIGS. 5-6, each P2P attribute field 530 includes an attribute identifier (ID) field 600, a length field 610 to provide sizing information for the P2P attribute, and an attribute body field 620. The attribute ID field 600 comprises an identifier that indicates the type of P2P attribute. An illustrative listing 700 of the attribute identifiers is shown in FIG. 7.

For instance, the attribute ID field 600 may include a value (e.g., octet value "4" 710) to identify that the P2P attribute represents the group owner intent attribute. As a result, the attribute body field 620 includes (i) a group owner intent value (describe below) that is used for selection of a P2P group owner during formation of a P2P group and (ii) a tie-breaking bit that is used for selecting the P2P group owner if the group owner intent values for two P2P network devices seeking to become the P2P group owner are equal. It is contemplated that, for the first message 400 from the P2P edge device $110_1$, the group owner intent value is always set to a maximum value (e.g., "15" within a given range 0-15) and the tie-breaking bit is always set. This ensures that the P2P edge device $110_1$ of FIG. 1 is the group owner of the first P2P group 170 so that P2P group formation can be more reliably managed.

Referring back to FIG. 4, as stated above, the first message 400 comprises a plurality of P2P attributes 420, including P2P capabilities 422, P2P Device ID 424, Listen Channel 426 and Extended Listen Timing 428.

The P2P capabilities 422 identify the capabilities of the P2P edge device $110_1$, which transmitted the first message 400. As an example, the P2P capabilities may include, but is not limited or restricted to the following: (1) information identifying whether or not the P2P edge device $110_1$ may be discovered in the P2P Discovery phase; (2) information identifying whether or not the P2P edge device $110_1$ supports P2P group invitation; (3) information identifying whether or not the P2P edge device $110_1$ can be a member of multiple P2P groups; (4) a group capability bitmap that identifies whether the P2P edge device $110_1$ supports intra-BSS distribution that allows the device $110_1$ to directly communicate with other P2P network devices in the same P2P group; (5) information identifying that the P2P edge device $110_1$ may be a P2P group owner; and/or (6) information identifying whether the P2P edge device $110_1$ is currently undergoing another group formulation phase in order to avoid concurrent P2P group formations involving the same P2P network device.

The P2P Device ID 424 comprises information directed to a specific device address for a P2P network device targeted to receive the first message 400. For instance, the P2P Device ID attribute 424 may include a device address (e.g., Internet Protocol (IP) address or MAC address) that identifies the transmitting P2P network device.

The Listen Channel 426 identifies an operating class and channel number on which the P2P edge device $110_1$ is in a listen state (e.g., tuned to a specific operating frequency channel to monitor wireless messages on that channel). For instance, the Listen Channel 426 may include the channel over which the PROBE REQUEST message was sent or a dedicated listen channel (e.g., channels 1, 6 or 11 for 2.4 GHz frequency band).

The Extended Listen Timing 426 is an attribute that identifies an amount of time that the P2P network device will remain in the listen state in efforts to detect a response (e.g. PROBE RESPONSE message) to the transmitted message (e.g., PROBE REQUEST message) within the operating frequency channel set by the Listen Channel attribute 426.

Optionally, the plurality of P2P attributes 420 may include an Operating Channel attribute 429, which identifies information associated with the operating channel, including country code and channel number.

Referring back to FIGS. 1 and 4, in response to receipt of the first message 400 (e.g., PROBE REQUEST message), the second P2P network device (e.g., P2P Resource device $140_1$) in the RF neighborhood 150 transmits a second message 450 to the first P2P edge device $110_1$. According to one embodiment of the disclosure, the second message 450 may operate as a PROBE RESPONSE message, which includes a header portion 455 and a body portion 460. The body portion 460 comprises a P2P information element (P2P IE) 465, which includes a plurality of P2P attributes such as P2P capabilities 470, Extended Listen Timing 475, and P2P Device Information 480.

Similar to the description above, according to this illustrative embodiment, the P2P capabilities 470 identifies the capabilities of the P2P resource device $140_1$ that transmitted the second message 450. Also, the Extended Listen Timing 475 identifies an amount of time that the P2P resource device $140_1$ will listen for a response to the second message 450 (e.g. Group Owner Negotiation Request message).

The P2P Device Information 480 comprises information directed to the P2P resource device $140_1$. For instance, the P2P Device Information 480 may include a device name and/or address information (e.g., IP address, MAC address, etc.) associated with the P2P resource device $140_1$. Additionally, or in the alternative, the P2P Device Information attribute 480 may include information that identifies configurations supported by the P2P resource device $140_1$.

Thereafter, during the P2P Discovery phase, the P2P edge device $110_1$ continuously updates a discovery list 490 with information from the P2P IEs that is extracted from responses (e.g., PROBE RESPONSE messages) from the P2P network devices that received a query message (e.g., PROBE REQUEST message) from the P2P edge device $110_1$. The information within the discovery list 490 may be accessed and analyzed by the P2P edge device $110_1$ during the P2P Group Owner Negotiation phase in order to (i) select one of the detected P2P network devices (e.g., the P2P resource device $140_1$) and (ii) commence formulation of a P2P group by selection of a group owner for that P2P group, as described below.

V. P2P Group Owner Negotiation Phase

Referring back to FIGS. 1 and 3, after discovering other P2P network devices within its RF neighborhood 150, the first P2P network device and/or the second P2P network device conducts the P2P Group Owner Negotiations phase (block 310). The P2P group owner negotiations are conducted until a P2P edge device (e.g., P2P edge device $110_1$) is established as the group owner (blocks 315-325).

Figure 8:
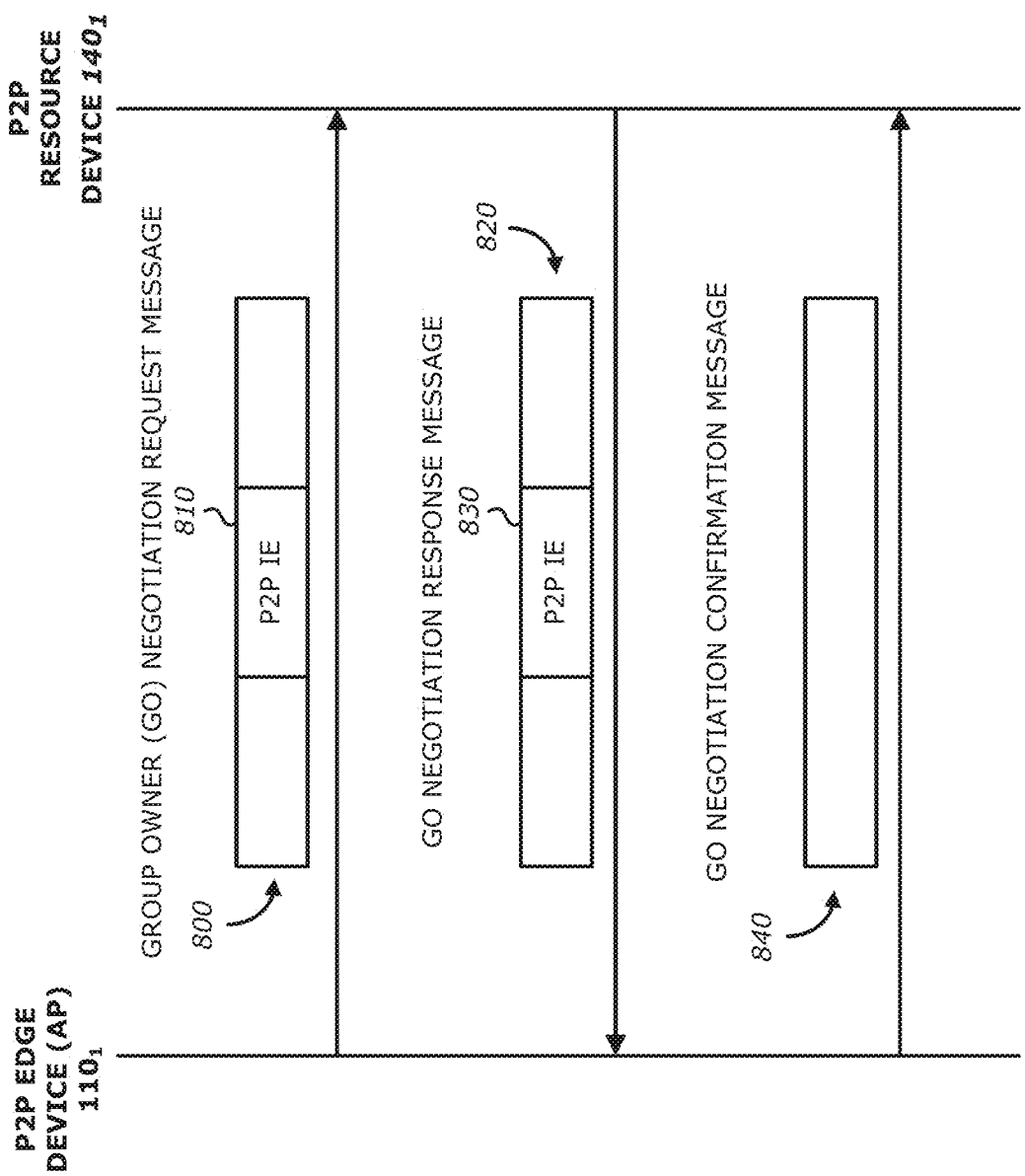
FIG. 8 is an exemplary embodiment of a communication flow of the P2P Group Owner Negotiation phase.

More specifically, as shown in FIG. 8, an exemplary embodiment of signaling in order to establish a group owner for a P2P group is described. Herein, according to one embodiment of the disclosure, based on the P2P network devices uncovered during P2P Device Discovery phase the P2P edge device $110_1$ transmits a Group Owner (GO) Negotiation Request message 800 to a selected P2P network device (e.g., P2P resource device $140_1$). As shown, the GO Negotiation Request message 800 features a P2P information element (P2P IE) 810, which comprises a plurality of fields, including a length field 910, P2P network device information field(s) 920 and one or more P2P attribute fields 930 as shown in FIG. 9. Herein, the P2P attribute fields 930 may include, but are not limited or restricted to one or more of the following: P2P capabilities 940, P2P Device Information 945, Group Owner Intent 950, Configuration Timeout 955, Listen Channel 960 and Extended Listen Timing 965, Intended P2P Interface Address 970, Channel List 975 and Operating Channel Attributes 980.

The length field 910 identifies the total length of the P2P IE 810, including the size of the P2P attribute fields 930. The P2P network device information field(s) 920 include an Organizationally Unique Identifier (OUI) field 922 and OUI Type field 924. The OUI field 922 identifies the manufacturer of the P2P network device that is transmitting the message including the P2P IE 810 (e.g., manufacturer of a P2P network device transmitting the GO Negotiation Request message 800 of FIG. 8), which is represented as the P2P edge device $110_1$ for this embodiment.

For this embodiment, the P2P capabilities 940 identify the capabilities of the P2P edge device $110_1$ that transmitted the GO Negotiation Request message 800. As an example, the P2P capabilities may include, but is not limited or restricted to the following: (1) information identifying whether or not the P2P edge device $110_1$ supports group invitation; (2) information identifying whether or not the P2P edge device $110_1$ can be a member of multiple P2P groups; (3) a group capability bitmap that identifies whether the P2P edge device $110_1$ supports intra-BSS distribution that allows the device $110_1$ to directly communicate with other P2P network devices in the same P2P group; (4) information identifying that the P2P edge device $110_1$ may be a P2P group owner; and/or (5) information identifying whether the P2P edge device $110_1$ is currently undergoing group formulation phase in order to avoid concurrent P2P group formations involving the same P2P network device.

The P2P Device Information 945 comprises information directed to identifying the P2P edge device $110_1$ that transmitted GO Negotiation Request message 800 of FIG. 8. For instance, the P2P Device Information attribute 945 may include a device name and/or an address (e.g., Internet Protocol (IP) address or MAC address) for the P2P edge device $110_1$.

The Group Owner Intent 950 comprises (i) a group owner intent value associated with the P2P edge device $110_1$ and (ii) a tie-breaking bit. Given that the P2P network device transmitting the GO Negotiation Request message 800 is an edge device, the group owner intent value is set to a maximum value (e.g., "15" within a given range 0-15) and the tie-breaking bit is set to denote, in the event that both the P2P edge device $110_1$ and the P2P resource device $140_1$ have the same group owner intent value, that the P2P edge device $110_1$ shall be the P2P group owner or no P2P group shall be formed yet. Of course, it is contemplated that the group owner intent value may be set to a value that increases the likelihood of the P2P edge device $110_1$ obtaining the Group Owner (GO) role.

The Configuration Timeout 955 identifies a prescribed period of time that the P2P edge device $110_1$ is configured to wait prior to a timeout condition. A timeout condition results when no response to the GO Negotiation Request message 800 is received within the prescribed period of time. It is contemplated that the prescribed period of time may be static or dynamic based on characteristics associated with either or both of the P2P network devices involved in the GO negotiations, characteristics associated with the wireless network, or the like.

The Listen Channel P2P 960 identifies an operating class and channel number on which the P2P edge device $110_1$ is in a listen state (e.g., tuned to a specific operating frequency channel to monitor wireless messages on that channel). For instance, the Listen Channel P2P attribute 960 may include the channel over which the GO Negotiation Request message 800 was recently sent or a dedicated listen channel (e.g., channels 1, 6 or 11 for 2.4 GHz frequency band).

The Extended Listen Timing 965 identifies an amount of time that the P2P network device will remain in the Listen state in efforts to detect a response (e.g. PROBE RESPONSE message) to the transmitted message (e.g., PROBE REQUEST message).

The Intended P2P Interface Address 970 includes a device address that the P2P edge device $110_1$ shall use during provisioning if group owner negotiations succeeds.

The Channel List 975 includes a listing of all of the operating frequency channels supported by the P2P edge device $110_1$. For instance, when supporting the 2.4 GHz frequency band, the P2P edge device $110_1$ may support channels 1-11 within the 2.4 GHz frequency band for operations within the United States or channels 1-13 for operations within other countries. When supporting the 5

GHz frequency band, the P2P edge device $110_1$ may support channels 36, 40, 44, 48, 52, 56, 60, 64, 100, 104, 108, 112, 116, 132, 136, 140, 149, 153, 157, 161 and 165 for operations within the United States. The channels may be country dependent. For instance, when the P2P network devices are deployed in Europe or Japan, the channel list may include channels 120, 124 and 128 and exclude channels 149, 153, 157, 161 and 165.

Operating Channel 980 identifies information associated with the operating channel, including country code and channel number. The operating channel indicates the intended operating channel for the P2P group if the first P2P network device is to become the group owner (e.g., P2P edge device $110_1$ is to become the GO_AP). Otherwise, the operating channel indicates the preferred operating channel for the P2P group, or may be omitted.

Referring back to FIG. 8, upon receipt of the Group Owner (GO) Negotiation Request message 800 from the P2P edge device $110_1$, the P2P resource device $140_1$ generates a GO Negotiation Response message 820. As shown, the GO Negotiation Response message 820 features a P2P information element (P2P IE) 830, which comprises a plurality of fields, including a length field 1010, P2P network device information field(s) 1020 and one or more P2P attribute fields 1030 as shown in FIG. 10. The functionality of these fields is similar to the GO Negotiation Request message 800 of FIG. 9. However, the P2P attribute fields 1030 are slightly different than the P2P attribute fields 930 of FIG. 9.

More specifically, the P2P attribute fields 1030 may include, but are not limited or restricted to one or more of the following: P2P capabilities 1040, P2P Device Information 1045, Group Owner Intent 1050, Configuration Timeout 1055, Intended P2P Interface Address 1070, Channel List 1075 and Operating Channel Attributes 1080.

For this embodiment, the P2P capabilities 1040 identify the capabilities of the P2P resource device $140_1$ that transmitted the GO Negotiation Response message 820. As an example, the P2P capabilities may include, but is not limited or restricted to the following: (1) information identifying whether or not the P2P resource device $140_1$ supports group invitation; (2) information identifying whether or not the P2P resource device $140_1$ can be a member of multiple P2P groups; (3) a group capability bitmap that identifies whether the P2P resource device $140_1$ supports intra-BSS distribution that allows the device $140_1$ to directly communicate with other P2P network devices in the same P2P group; (4) information identifying that the P2P resource device $140_1$ may be a P2P group owner; and/or (5) information identifying whether the P2P resource device $140_1$ is currently undergoing group formulation phase in order to avoid concurrent P2P group formations involving the same P2P network device.

The P2P Device Information 1045 comprises information directed to identifying the P2P resource device $140_1$ that transmitted GO Negotiation Response message 820 of FIG. 8. For instance, the P2P Device Information 1045 attribute 1045 may include a device name and/or an address (e.g., Internet Protocol (IP) address or MAC address) for the P2P resource device $140_1$.

Figure 11:
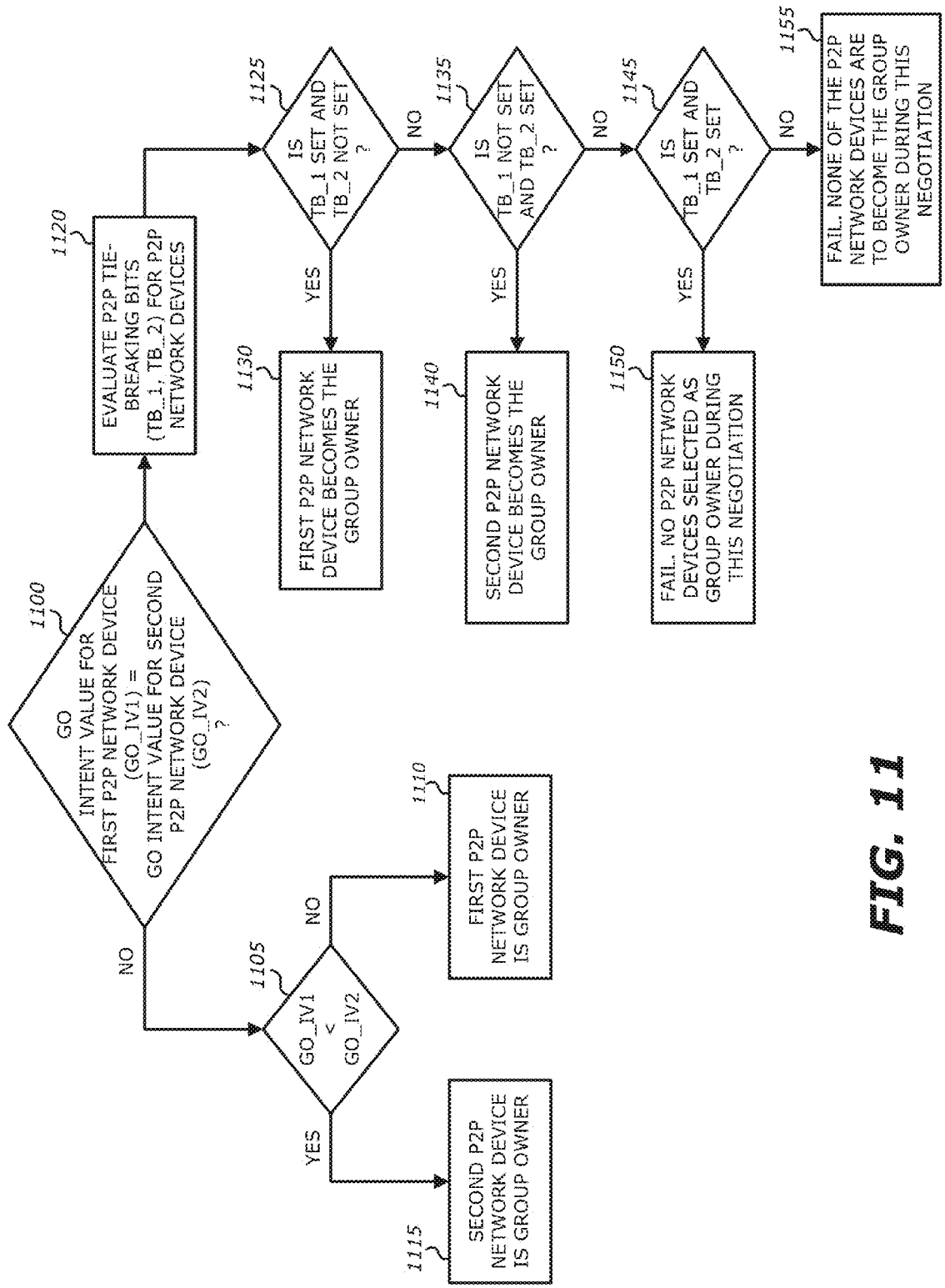
FIG. 11 is an exemplary embodiment of the operations associated with selection of the group owner (GO).

The Group Owner Intent 1050 comprises (i) a group owner intent value associated with the P2P resource device $140_1$ and (ii) a tie-breaking bit. The group owner intent value is set to a value associated with the desired level for that particular type of P2P network device should manage the P2P group, as there may be more P2P groups that edge devices within the wireless network. Furthermore, except for edge devices, the tie-breaking bit is randomly set as a tie-breaking value, in the event that both the P2P network devices negotiating for group ownership have the same group owner intent value. The group owner intent value may be completed with the group owner intent value provided by the first P2P network device, where the group owner is selected as illustrated in FIG. 11 and described below.

The Configuration Timeout 1055 identifies a prescribed period of time that the P2P resource device $140_1$ is configured to wait prior to a timeout condition. Herein, a timeout condition results when no response to the GO Negotiation Response message 800, such as a GO Negotiation Conformation message 840 for example, is received within the prescribed period of time. It is contemplated that the prescribed period of time may be static or dynamic based on characteristics associated with either or both of the P2P network devices involved in the GO negotiations, characteristics associated with the wireless network, or the like.

The Intended P2P Interface Address 1070 includes a device address that the second P2P network device (e.g., P2P resource device $140_1$) shall use during provisioning if group owner negotiation succeeds for the second P2P network device.

The Channel List 1070 includes a listing of all of the operating frequency channels supported by the P2P resource device $140_1$, as described above. The listing may be dependent on the country code designated as operability of the P2P resource device $140_1$.

Operating Channel 1080 identifies information associated with the operating channel, including country code and channel number. The operating channel indicates the intended operating channel for the P2P group if the P2P resource device $140_1$ would have become the group owner, where the group owner intent values are not randomly assigned or pseudo-randomly assigned given that such values are maximized for edge devices. Normally, the operating channel indicates the preferred operating channel for the P2P group, or may be omitted.

Referring now to FIG. 11, an exemplary embodiment of the operations associated with selection of the group owner is shown. Initially, as shown in block 1100, a comparison is conducted between the GO intent value for the first P2P network device (GO_IV1) and the GO intent value for the second P2P network device (GO_IV2). In the event that GO_IV1 is not equal to GO_IV2, the first P2P network device becomes the group owner and undertakes the GO role if GO_IV1 is greater than GO_IV2 (blocks 1105 and 1110). Conversely, the second P2P network device becomes the group owner and undertakes the GO role if GO_IV2 is greater than GO_IV1 (blocks 1105 and 1115).

In the event that GO_IV1 is equal to GO_IV2, the tie-breaking bits for the first P2P network device and the second P2P network device are evaluated (block 1120). If the tie-breaking bit for the first P2P network device is set and the tie-breaking bit for the second P2P network device is not set, the first P2P network device becomes the group owner and undertakes the GO role (blocks 1125 and 1130). However, if the tie-breaking bit for the second P2P network device is set and the tie-breaking bit for the first P2P network device is not set, the second P2P network device becomes the group owner and undertakes the GO role (blocks 1135 and 1140).

As a last condition, if the tie-breaking bit for the first P2P network device is set and the tie-breaking bit for the second P2P network device is also set, no group owner is selected (blocks 1145 and 1150). Rather, the first P2P network device may retry formation of the P2P group or select a different P2P network device for initial formulation of the P2P group. Where none of the tie-breaking bits are set, a failure condition occurs for group owner negotiations, and thus, a retry condition occurs or a different P2P network device is selected for group owner selection. Of course, where one of the P2P network devices seeking group ownership is a P2P edge device, the other P2P network device may be substituted prior to conducting another group owner negotiation.

Referring to FIGS. 8 and 12, after the group owner is selected, such as a situation where the first P2P network device is the P2P edge device $110_1$ and is selected as the group owner, the P2P edge device $110_1$ transmits a GO Negotiation Confirmation message 830, which includes P2P IE 840. The P2P IE 840 of the GO Negotiation Confirmation message 830 features a plurality of P2P attributes 1200. The plurality of P2P attributes 1200 include, inter alia, information associated with the P2P Capabilities 900, Channel List 975 and Operating Channel Attributes 980. Additionally, the P2P attributes 1200 include Status 1210, which indicates successful negotiation of the group owner.

VI. P2P Group Management Phase

Figure 13:
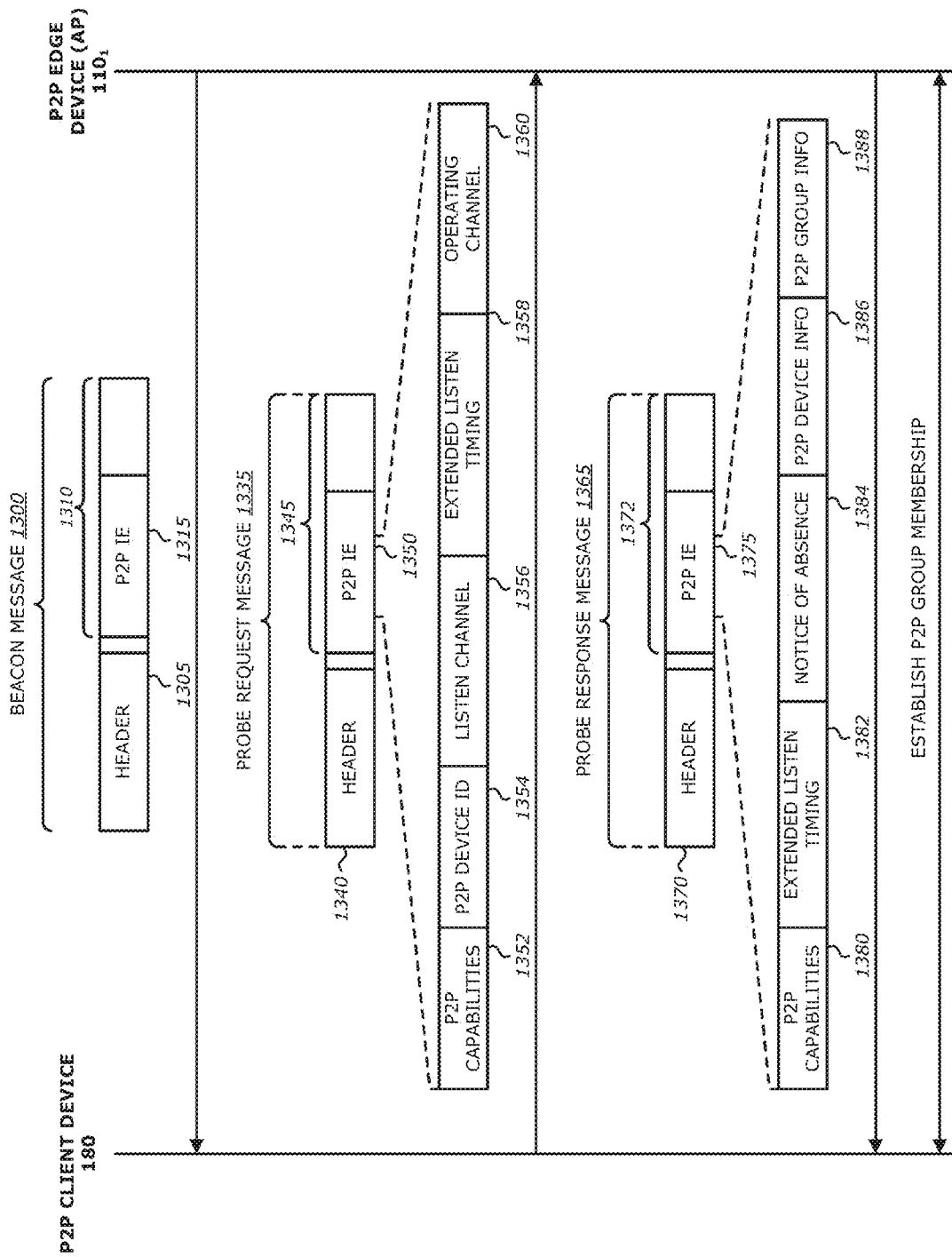
FIG. 13 is an exemplary embodiment of a communication flow of the P2P Group Management phase.

Referring now to FIGS. 1 and 13, upon assigned P2P group owner of the P2P group during GO Negotiation phase, the P2P edge device $110_1$ transmits a message 1300 to identify the presence of the P2P group 170 during the P2P Group Management phase. According to one embodiment of the disclosure, the message 1300 may be a broadcast message such as a beacon. Of course, it is contemplated that, in lieu of a broadcast message, a multicast message may be transmitted. For instance, a registration process may be deployed where only registered network devices may join a particular P2P group within the wireless network.

More specifically, as an illustrative embodiment, during the P2P Group Management phase, the P2P edge device $110_1$ transmits a P2P group message 1300 (e.g., broadcasted beacon message) that includes a header portion 1305 and a body portion 1310. The body portion 1310 comprises a P2P information element (P2P IE) 1315, which includes a plurality of P2P attributes. For this embodiment, the P2P attributes include P2P capabilities 1320, P2P Device Identifier (ID) 1325, and Notice of Absence 1130 as shown in FIG. 14.

Referring to FIG. 14, the P2P capabilities 1320 identify the capabilities of the P2P edge device $110_1$, which transmitted the broadcast message 1300. As an example, the P2P capabilities 1320 may include, but is not limited or restricted to the following: (1) information identifying whether or not the P2P edge device $110_1$ supports P2P group invitation; and (2) information identifying that the P2P edge device $110_1$ is a P2P group owner.

The P2P Device Information 1325 comprises information directed to the P2P edge device $110_1$. For instance, the P2P Device Information 1325 may include a device name and/or address information (e.g., IP address, MAC address, etc.) associated with the P2P edge device $110_1$. Additionally, or in the alternative, the P2P Device Information attribute 1325 may include information that identifies configurations supported by the P2P edge device $110_1$.

The Notice of Absence attribute 1330 is present in the P2P IE 1315 when a schedule is being advertised to identify times at which the P2P edge device $110_1$ will be unavailable.

Referring to FIGS. 1 and 13, in response to receipt of the broadcast or multicast message 1300 (e.g., beacon message), a P2P network device (e.g., P2P Client device 180) in the RF neighborhood 150 transmits a query message to the P2P edge device $110_1$. According to one embodiment of the disclosure, the P2P edge device $110_1$ transmits a query message 1335 (e.g., PROBE REQUEST message) that includes a header portion 1340 and a body portion 1345. The body portion 1345 comprises a P2P information element (P2P IE) 1350, which includes a plurality of P2P attributes. For this embodiment, the P2P attributes include P2P capabilities 1352, P2P Device Identifier (ID) 1354, Listen Channel 1356, Extended Listen Timing 1358 and Operating Channel 1360 as shown in FIG. 13. The functionality of these P2P attribute is consistent with the PROBE REQUEST message transmitted during the P2P Device Discovery phase as previously described in reference to FIGS. 5-7, but information associated with the P2P client device 180 is provided.

In response to the second message 1335 (e.g., PROBE REQUEST message), P2P edge device $110_1$ transmits a third message 1365, which operates as a PROBE RESPONSE message. The third message 1365 features a header portion 1370 and a body portion 1372. The body portion 1372 comprises a P2P information element (P2P IE) 1375, which includes a plurality of P2P attributes such as P2P capabilities 1380, Extended Listen Timing 1382, Notice of Absence 1384, P2P Device Information 1386 and P2P Group Information 1388.

Similar to the description above, according to this illustrative embodiment, the P2P capabilities 1380 identifies the capabilities of the P2P edge device $110_1$ that transmitted the third message 1365. Also, the Extended Listen Timing 1382 identifies an amount of time that the P2P edge device $110_1$ will listen for a response by associating with the P2P edge device $110_1$ and subsequently joining the P2P group.

The Notice of Absence attribute 1384 is present in the P2P IE 1375 to advertise scheduled times at which the P2P edge device $110_1$ will be unavailable.

The P2P Device Information 1386 comprises information directed to the P2P edge device $110_1$. For instance, the P2P Device Information 1386 may include a device name and/or address information (e.g., IP address, MAC address, etc.) associated with the P2P edge device $110_1$. Additionally, or in the alternative, the P2P Device Information attribute 1386 may include information that identifies configurations supported by the P2P edge device $110_1$.

The P2P Group Information 1388 provides a listing of P2P network devices that are members of the P2P group 170 along with capabilities of these P2P network devices. As shown in FIG. 15, the P2P Group Information attribute 1388 comprises one or more P2P Network Device Information Descriptors 1500, which lists information of P2P network devices that are members of the P2P group in which the P2P edge device operates as the group owner and is associated with the P2P group owner.

As shown in FIG. 16, each P2P Network Device Information Descriptors 1500 features a plurality of P2P attributes fields 1600. According to one embodiment of the disclosure, the P2P attribute fields 1600 may include, but are not limited or restricted to one or more of the following: Length 1610, P2P Device Address 1615, Intended P2P Interface Address 1620, Device Compatibility Bitmap 1625 and Configuration Methods 1630.

The Length field 1610 identifies the total length of the P2P Network Device Information Descriptors 1500, including the size of all of the P2P attribute fields 1600. The P2P device address 1615 include an identifier that is used to uniquely reference the P2P edge device $110_1$. For instance, the identifier may be an OUI, as described above.

The Intended P2P Interface Address 1620 includes a device address that used to identify the P2P edge device 110₁ within the P2P group.

The Device Compatibility Bitmap 1625 indicates a bitmap that is used to represent a number of capabilities. Herein, the bitmap provides a set of parameters that indicate P2P capabilities of the P2P edge device 110₁.

The Configuration Method 1630 indicates the communication protocols that are supported by the P2P edge device 110₁. These protocols may identify that the device 1101 supports keyboard pin access security schemes or the like.

This invention may be embodied in other forms without departing from the spirit or essential attributes thereof. Accordingly, reference should be made to the following claims, rather than to the foregoing specification, as indicating the scope of the invention.

What is claimed is:

1. A non-transitory computer readable medium comprising instructions which, when executed by a processor, causes the processor to:
   transmit, by a first network device, a Peer-To-Peer (P2P) Probe Request message;
   receive, by the first network device, a Peer-To-Peer Probe Response message from a second network device;
   negotiate, by the first network device with the second network device, a Group Owner (GO) role for a Peer-To-Peer group by setting, in a GO negotiation message transmitted from the first network device to the second network device, a group intent field to a maximum value and a tie-breaking field to denote that the first network device obtains the GO role in an event of a tie for the group intent field, wherein the first network device comprises an access point; and
   in response to the first network device failing to negotiate the GO role for the Peer-To-Peer group, refrain from forming the Peer-to-Peer group.

2. The medium of claim 1, wherein the first network device is an edge device.

3. The medium of claim 1, wherein setting the group intent field to the maximum value and the tie-breaking field to denote that the first network device obtains the GO role in the event of the tie for the group intent field increases a likelihood of the first network device obtaining the P2P owner role.

4. The medium of claim 1, wherein the medium further comprises instructions to:
   determine a set of P2P capabilities of the first network device, wherein the set of P2P capabilities comprises: (1) information identifying whether the first network device supports group invitation; (2) information identifying whether the first network device is a member of multiple P2P groups; (3) a group capability bitmap that identities whether the first network device supports direct communication with other peer network devices in the P2P group; (4) information identifying that the first network device is a P2P group owner; and (5) information identifying whether the first network device undergoes group formulation phase; and
   generate a P2P information element (IE) based on the set of P2P capabilities; and
   including the P2P IE in the GO negotiation message transmitted from the first network device to the second network device.

5. The medium of claim 1, wherein the instructions to negotiate the GO role comprises instructions to:
   transmit a first message from the first network device to the second network device, the first message includes (i) a GO intent value set to a maximum GO intent value along with a tie-breaking bit being set, (ii) information associated with the first network device, and (iii) a listing of operating frequency channels supported by the first network device;
   receive a second message from the second network device, the second message includes (i) a GO intent value, (ii) information associated with the second network device, and (iii) a listing of operating frequency channels supported by the second network device;
   place the first network device in the GO role upon determining that the maximum GO intent value in the first message is greater than the GO intent value in the second message.

6. The medium of claim 1, wherein the instructions to negotiate the GO role comprises instructions to:
   receive a first message from the second network device, the first message includes (i) a GO intent value; (ii) information associated with the second network device, and (iii) a listing of operating frequency channels supported by the second network device;
   in response to the first message, transmit a second message from the first network device to the second network device, the second message includes (i) a GO intent value set to a maximum GO intent value along with a tie-breaking bit being set, (ii) information associated with the first network device; and (iii) at least one operating frequency channel supported by the first network device;
   place the first network device in the GO role with the Peer-to-Peer group operating on the at least one operating frequency channel upon both the first network device and the second network device determining that the maximum GO intent value is greater than the GO intent value.

7. The medium of claim 1; wherein the Peer-To-Peer Probe Request message and the Peer-To-Peer Probe Response message correspond to a wireless peer-to-peer protocol that allows two devices to connect with each other without the access point.

8. The medium of claim 1, comprising instructions to:
   transmit, by the first network device, a message identifying the Peer-to-Peer group and information associated with network devices that are members of the Peer-to-Peer group;
   receive, by the first network device, a message from a network device requesting to join the Peer-to-Peer group;
   upon granting access for the network device to join the Peer-to-Peer group, store information associated with the network device for use in subsequent transmission of messages in management of the Peer-to-Peer group by the first network device while allowing the network device to communicate directly with the second network device being a member of the Peer-to-Peer group.

9. The medium of claim 8, wherein the message identifying the Peer-to-Peer group that is transmitted after the negotiating operation comprises a Basic Service Set Identifier (BSSID) corresponds to a wireless network advertised by the first network device.

10. A system comprising:
    a controller; and
    an access point communicatively coupled to the controller and having Peer-to-Peer (P2P) functionality, the access point includes hardware logic that comprises at least one processor, a memory, and a communication interface that includes radio circuitry, wherein the hardware logic is to perform operations comprising:
transmitting a P2P Probe Request message;
receiving a P2P Probe Response message from a network device having P2P functionality and remotely located from the access point;
negotiating with the network device a Group Owner (GO) role for a P2P group by setting, in a GO negotiation message transmitted from the access point to the network device, a group intent field to a maximum value and a tie-breaking field to denote that the first network device obtains the GO role in an event of a tie for the group intent field; and
in response to the access point failing to negotiate the GO role for the Peer-To-Peer group, refrain from forming the Peer-to-Peer group.

11. The system of claim 10, wherein setting the group intent field to the maximum value and the tie-breaking field to denote that the first network device obtains the GO role in the event of the tie for the group intent field increases a likelihood of the first network device obtaining the P2P owner role.

12. The system of claim 10, wherein the hardware logic is further to perform operations comprising:
determining a set of P2P capabilities of the access point, wherein the set of P2P capabilities comprises: (1) information identifying whether the access point supports group invitation; (2) information identifying whether the access point is a member of multiple P2P groups; (3) a group capability bitmap that identifies whether the access point supports direct communication with other peer network devices in the P2P group; (4) information identifying that the access point is a P2P group owner; and (5) information identifying whether the access point undergoes group formulation phase; and
generating a P2P information element (IE) based on the set of P2P capabilities; and
including the P2P IE in the GO negotiation message transmitted from the access point to the network device.

13. The system of claim 10, wherein the negotiating of the GO role by the access point comprises:
transmitting a first message from the access point via the radio circuitry to the network device, the first message includes (i) a GO intent value set to a maximum GO intent value along with a tie-breaking bit being set, (ii) information associated with the access point, and (iii) a listing of operating frequency channels supported by the access point;
receiving a second message by the access point from the network device, the second message includes (i) a GO intent value, (ii) information associated with the network device, and (iii) a listing of operating frequency channels supported by the network device;
placing the access point in the GO role upon determining that the maximum GO intent value is greater than the GO intent value.

14. The system of claim 10, wherein the negotiating of the GO role by the access point comprises:
receiving a first message from the network device, the first message includes (i) a GO intent value, (ii) information associated with the network device, and (iii) a listing of operating frequency channels supported by the network device;
in response to the first message, transmitting a second message from the access point to the network device, the second message includes (i) a GO intent value set to a maximum GO intent value along with a tie-breaking bit being set, (ii) information associated with the access point, and (iii) at least one operating frequency channel supported by the access point;
placing the access point in the GO role with the P2P group operating on the at least one operating frequency channel upon both the access point and the network device determining that the maximum GO intent value is greater than the GO intent value.

15. The system of claim 10, wherein the P2P Probe Request message and the P2P Probe Response message correspond to a wireless peer-to-peer protocol that allows two devices to connect with each other without the access point.

16. The system of claim 10, wherein the operations performed by the hardware logic of the access point further comprise:
transmitting, via the radio circuitry of the access point, a message identifying the P2P group and information associated with network devices that are members of the P2P group;
receiving a message from a second network device requesting to join the P2P group;
upon granting access for the second network device to join the P2P group, storing information associated with the second network device for use in subsequent transmission of messages in management of the P2P group by the access point while allowing the second network device to communicate directly with the network devices that are part of the P2P group.

17. The system of claim 16, wherein the message identifying the P2P group that is transmitted after the negotiating operation comprises a Basic Service Set Identifier (BSSID) corresponds to a wireless network advertised by the access point.

18. A first network device comprising:
a processor;
a memory coupled to the processor; and
a communication interface in communication with the processor, the communication interface includes radio circuitry,
wherein the processor, operating with the communication interface, (i) transmits a peer-to-peer (P2P) Probe Request message, (ii) receives a P2P Probe Response message from a second network device having P2P functionality and remotely located from the first network device, (iii) negotiates, with the second network device, a Group Owner (GO) role for a P2P group by setting, in a GO negotiation message transmitted from the first network device to the second network device, a group intent field to a maximum value and a tie-breaking field to denote that the first network device obtains the GO role in an event of a tie for the group intent field; and (iv) in response to the first network device failing to negotiate the GO role for the Peer-To-Peer group, refrains from forming the Peer-To-Peer group, wherein the first network device comprises an access point.

19. The first network device of claim 18, wherein setting the group intent field to the maximum value and the tie-breaking field to denote that the first network device obtains the GO role in the event of the tie for the group intent field increases a likelihood of the first network device obtaining the P2P owner role.

20. The first network device of claim 18, wherein the processor further:

determines a set of P2P capabilities of the first network device, wherein the set of P2P capabilities comprises: (1) information identifying whether the first network device supports group invitation; (2) information identifying whether the first network device is a member of multiple P2P groups; (3) a group capability bitmap that identifies whether the first network device supports direct communication with other peer network devices in the P2P group; (4) information identifying that the first network device is a P2P group owner; and (5) information identifying whether the first network device undergoes group formulation phase; and generates a P2P information element (IE) based on the set of P2P capabilities; and includes the P2P IE in the GO negotiation message transmitted from the first network device to the second network device.

\* \* \* \* \*